Patented Aug. 28, 1928.

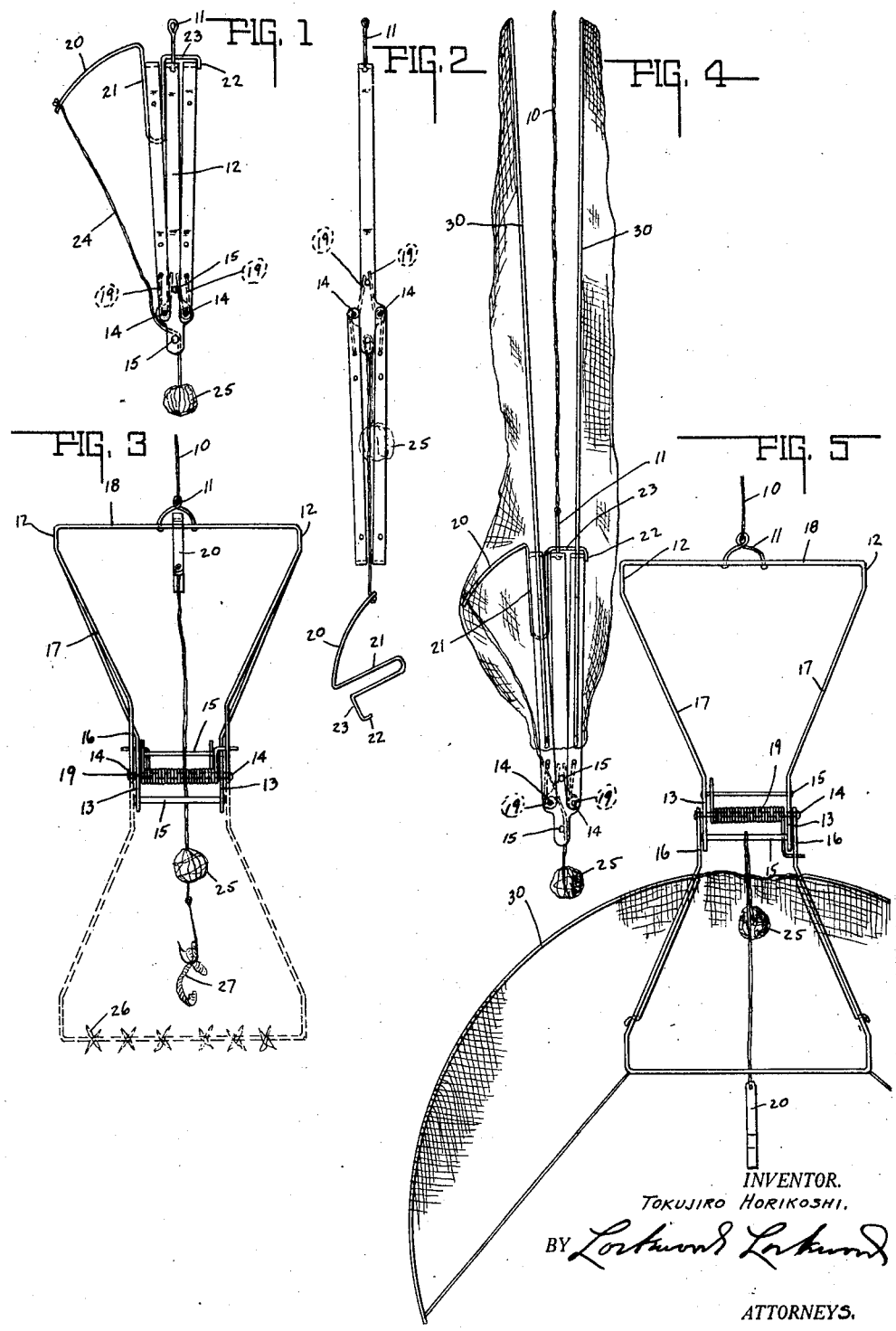

1,682,226

UNITED STATES PATENT OFFICE.

TOKUJIRO HORIKOSHI, OF LOS ANGELES, CALIFORNIA.

TRAP.

Application filed June 1, 1926. Serial No. 112,837.

This invention relates to a trap.

The chief object of the invention is to construct a trap that is readily adaptable for catching animals, birds and fishes.

The chief feature of the invention consists in the construction of a trap in such a manner that the same requires a single suspensible support.

The full nature of the invention will be understood from the accompanying drawings and the following description and claims:

In the drawings Fig. 1 is an end elevation of one form of trap in the set position. Fig. 2 is a similar view of the same in the clamping position. Fig. 3 is an end view thereof with the parts in the set position, the dotted lines indicating the clamping position. Fig. 4 is an end elevational view of a modified form of trap with the parts in the set position. Fig. 5 is a side view thereof in the clamping position.

In the drawings 10 indicates a supporting line or trolling line and suitably connected thereto as by the loop or swivel mounting 11, is the supporting framework 12 terminating in the spaced plates 13 supporting in parallel relation the pivot pins 14, said construction being united together by the transverse connectors 15. Mounted on each of the pivots 14 is a clamping member having the parallel ends 16, the laterally and outwardly projecting portions 17 and the intermediate connecting portion 18, the same in the present instance being arranged in substantially inverted triangular formation. Coiled about each pivot is a spring 19 having one end bearing on the framework or parts supported thereby, and the other end bearing on the clamping member for normally tilting said clamping member from the position shown in Fig. 1 to the position shown in Fig. 2.

Suitable catch means in the form of a single catch member includes an extension 20, the clamping member retaining portion 21, a second clamping member retaining portion 22 and an intermediate connecting portion 23, the same passing over the frame 12 and retained thereby. A line 24 connects the extension 20 to the bait or bait support 25, said line being threaded between the transverse members 15 so as to be centrally positioned. The catch means, therefore, is adapted simultaneously to maintain both clamping members in separated and set position and is adapted to release the same by a downward pull upon extension 20 which releases portion 21 from its clamping member and portion 22 from its clamping member, thereby releasing both clamping members substantially simultaneously into the position shown in Fig. 2.

The intermediate connecting portions 18 are each provided with suitable body escapement preventing means and in this form of the invention said means comprise a plurality of cooperating barbs 26. When the fish or animal takes the bait 27, the body will be clamped between the cooperating clamping portions 18 and the body will be caught therebetween and secured by reason of the barbs 26, if barbs are provided.

In the modified form of the invention shown in Figs. 4 and 5, the body escapement preventing means is of a different form and is shown comprised of a net. All of the remaining mechanism is substantially the same as that previously described and the nets are here indicated by the numeral 30 and are supported by the clamping framework. Thus, as the bird or fish takes the bait the nets will, by reason of the clamping movement of the framework, draw together and form a closed netted sack and trap the birds or fishes which have taken the bait and such others as may have been caught in the closing movement of the clamping members.

While the invention has been described in considerable detail and the several modifications thereof have been illustrated, it is to be understood that the form disclosed herein is merely conventional and for the purpose of illustration.

The invention claimed is:

1. A snap trap having a loop-shaped vertically extending main frame, a pair of clamping frames substantially similar in shape and size to said main frame, pivots mounted at the lower end of the main frame on opposite sides thereof and on which the corresponding ends of the clamping frames are pivoted side by side so that when the clamping frames are folded up into setting position they will be on opposite sides of the main frame and substantially parallel therewith and extend to the top of said main frame, a releasable catch engaging the upper ends of said three frames for holding the clamping frames in setting position, means connected with said catch for supporting the bait in position under the lower end of the main frame, and a spring coil on each of said pivots and engaging the main frame and the clamping frames for forcibly turning the clamping frames away from the main frame when released to a downward position beside the bait so that the two frames will clamp together in their downward position.

2. A snap trap having a vertically extending main frame, a pair of similar loop-shaped clamping frames pivoted on opposite sides of and to the lower end of said main frame so that said clamping frames may be turned upward against the opposite sides of said main frame, a catch releasably holding the upper ends of the clamping frames to said main frame when the clamping frames are turned upward for setting the trap, means connected with the catch for supporting the bait under the main frame and releasing the frames when the bait is disturbed, spring means for turning said clamping frames downward on opposite sides of the bait and in a position to clamp an animal at the bait when said catch is released, a looped net frame secured to each clamping frame by way of an extension thereof so as to move vertically with the clamping frame, and a net secured to each net frame, whereby when the trap is baited the nets will be held up out of the way of the hook and the animal when at the hook.

In witness whereof, I have hereunto affixed my signature.

TOKUJIRO HORIKOSHI.